United States Patent [19] [11] Patent Number: 4,860,188
Bailey et al. [45] Date of Patent: Aug. 22, 1989

[54] REDUNDANT POWER SUPPLY CONTROL

[75] Inventors: Walter H. Bailey, Johnson City, Tenn.; Kent Pettus, Conyers, Ga.

[73] Assignee: Texas Instruments Incorporated, Dallas, Tex.

[21] Appl. No.: 189,224

[22] Filed: May 2, 1988

[51] Int. Cl.⁴ .............................................. H02M 3/00
[52] U.S. Cl. .......................................... 363/65; 307/82
[58] Field of Search ....................... 307/82; 363/65, 71

[56] References Cited

U.S. PATENT DOCUMENTS 4,257,090 3/1981 Kroger et al. ......................... 363/65
4,628,433 12/1986 Notohamiprodjo ................... 363/65
4,698,738 10/1987 Miller et al. ........................... 363/71
4,729,086 3/1988 Lethellier .............................. 363/71

Primary Examiner—Patrick R. Salce
Assistant Examiner—Jeffrey Sterrett
Attorney, Agent, or Firm—James P. McAndrews; John A. Haug; Melvin Sharp

[57] ABSTRACT

A redundant power supply system wherein the standby power supplies are maintained in a powered up state at all times by feeding back a difference signal which is indicative of the voltage difference between the output of the power supply and a further difference voltage. The further difference voltage is indicative of the voltage drop across a diode located between the output from the power supply and the load of the entire power supply system.

9 Claims, 2 Drawing Sheets

REDUNDANT POWER SUPPLY CONTROL

BACKGROUND OF THE INVENTION

1. Field of the Invention

This invention relates to redundant power supply systems wherein one of the power supplies of the system is designed to be capable of providing the total required system power with the remaining power supplies being utilized for backup.

2. Brief Description of the Prior Art

The output terminals from redundant power supplies are normally connected together at the system load through diodes which decouple failed power supplies from the system by reverse biasing the diode in series with the failed power supply. The output voltage feedback signal for these power supplies is generally taken from the load side of the diode where precise voltage regulation is required.

A problem encountered in such power supply circuit arrangements is that minor variations in the output voltages among the individual ones of the redundantly connected power supplies are always present, this resulting in load power being supplied by the power supply having the largest (highest) output voltage. The power supplies in the system which have initially lower output voltages are in the standby mode and will display a continual reduction in their output voltages to near zero volts because the output voltage at the load always appears to the control loops of these individual power supplies to be too high, thereby causing the output voltages therefrom to continue to be reduced. Accordingly, since the output voltage at the load remains constant, the error voltage continues to drive the lower output voltage power supplies into an off condition. The feedback control loop is thus effectively opened because of blocked conduction due to the reverse biased series diode at the output of each of the standby power supplies. This effective shutdown of the power supplies operating in the standby mode causes many of the power supply self-tests to indicate failure conditions thereof when the power supplies are in fact capable of recovering to a fully functional status.

An additional problem may develop upon the sudden failure of the active power supply in the redundant configuration resulting in a transient voltage drop out as one of the power supplies operating in a standby mode recovers and assumes an active mode. The output filter capacitor for the standby power supplies would be nearly discharged and would require some amount of time to charge to the appropriate output voltage. This time would result in a voltage drop out condition at the load if the failure of the active power supply is sufficiently abrupt.

SUMMARY OF THE INVENTION

In accordance with the present invention, the above noted problems encountered in prior art redundant power supply systems are minimized and there is provided a redundant power supply system wherein all of the power supplies of the system are powered up at all times with defective power supplies being deactivated from the system.

The above is accomplished by altering the generation of the voltage feedback signals as compared with the prior art to avoid the opening of the control loop when diode conduction ceases.

Briefly, the above is accomplished by providing a first differential amplifier which generates an output voltage which is equal to or proportional to the voltage drop across the series diode to the load from each power supply. This voltage or an appropriately scaled version of this voltage is then differenced from the input voltage to the series diode by a second differential amplifier. The output voltage of the second amplifier is made equal to or proportional to the output voltage across the shared load. This circuitry permits the control loop to remain active in the power supplies which do not supply the load current in the redundant configuration, i.e., the standby power supplies.

In operation, when series diode conduction ceases, the voltage drop across the series diode drops to zero volts to provide a zero output from the first differential amplifier. Therefore, when zero volts at the output of the first amplifier is differenced from the diode input voltage by the second amplifier, the diode input voltage is then regulated to a value equal to the output voltage across the shared load. This operation avoids shutdown in the power supplies operating in the standby mode and permits voltage sensitive self tests to indicate a pass condition. This technique also reduces the likelihood of a power drop out in the event of a sudden failure of the active power supply since the output filter capacitor thereof will be charged to nearly the correct voltage instead of a nearly discharged condition as would exist in the prior art circuit configurations.

DESCRIPTION OF THE PREFERRED EMBODIMENT

Figure 1:
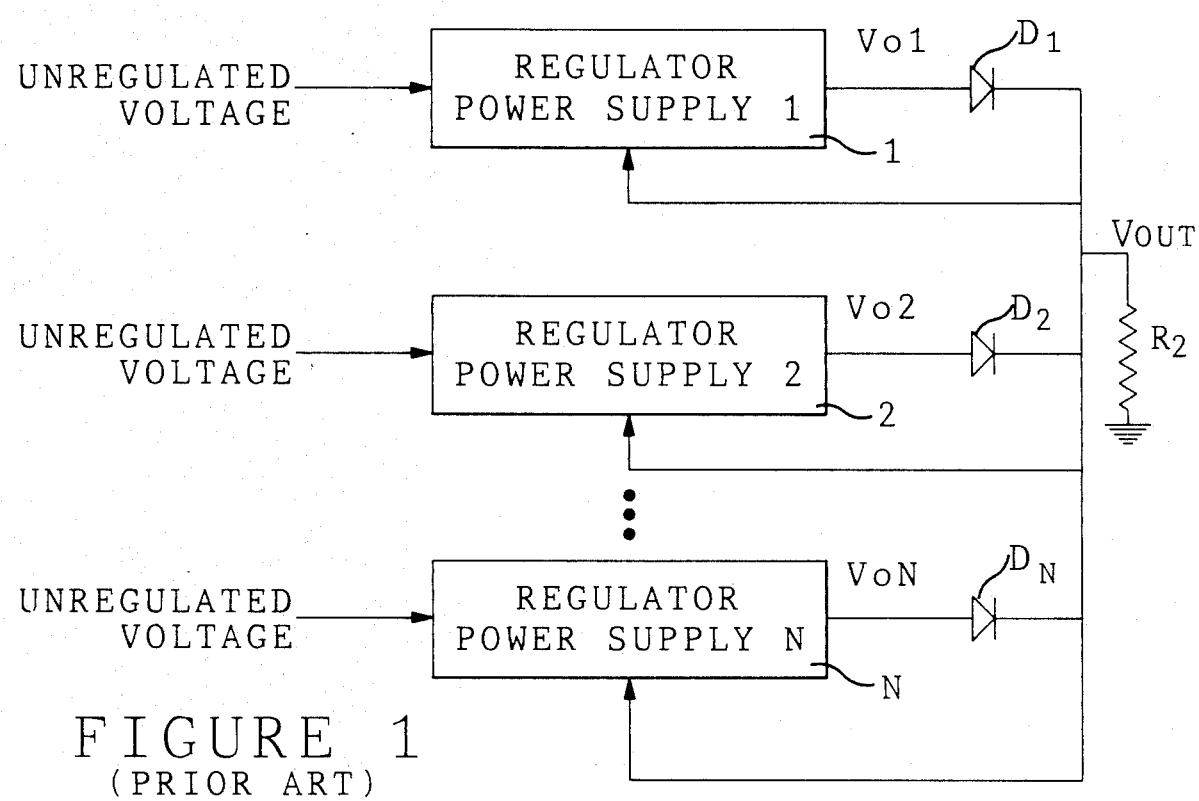
FIG. 1 is a block diagram of a prior art conventional redundant power supply system.

Referring first to FIG. 1, there is shown a block diagram of a conventional prior art redundant power supply system wherein only one of the power supplies is designed to provide all of the required load power. The remaining power supplies are utilized only for backup in the event the power supply supplying the power fails for some reason. The system includes a plurality of power supplies 1, 2, . . . n, each power supply being coupled to an output load and being capable of providing an output voltage, Vout, thereat through a separate diode D1, D2, . . . Dn connected in series between its respective power supply and the output load. A feedback signal is coupled from the output load back to each of the power supplies for voltage regulation.

As is well known, though each of the power supplies of the system is regulated by the same output voltage, the individual power supplies will not each provide the identical output voltage to the load RL through their respective diodes. Accordingly, all of the load power will be taken from the power supply of the system which supplies the highest voltage since only the diode associated therewith will be forward biased. The remaining power supplies will be in the standby mode and will undergo a reduction in their output voltages to near zero because the feedback voltages thereto will provide an indication that their outputs are too high, thereby causing this reduction in their output voltages. Since Vout remains constant, the error voltage fed back to each of the power supplies in the standby condition continues to increase, thereby driving the power supplies which are in the standby mode into an off condition. The control loop is thereby effectively opened because of the blocked conduction due to the reverse biased series diodes. This effective shutdown of the power supplies when operating in the standby mode causes many of the power supply self tests to indicate failure conditions when the power supply is actually capable of recovering to a fully functional state. It is this problem which is alleviated in accordance with the present invention.

Figure 2:
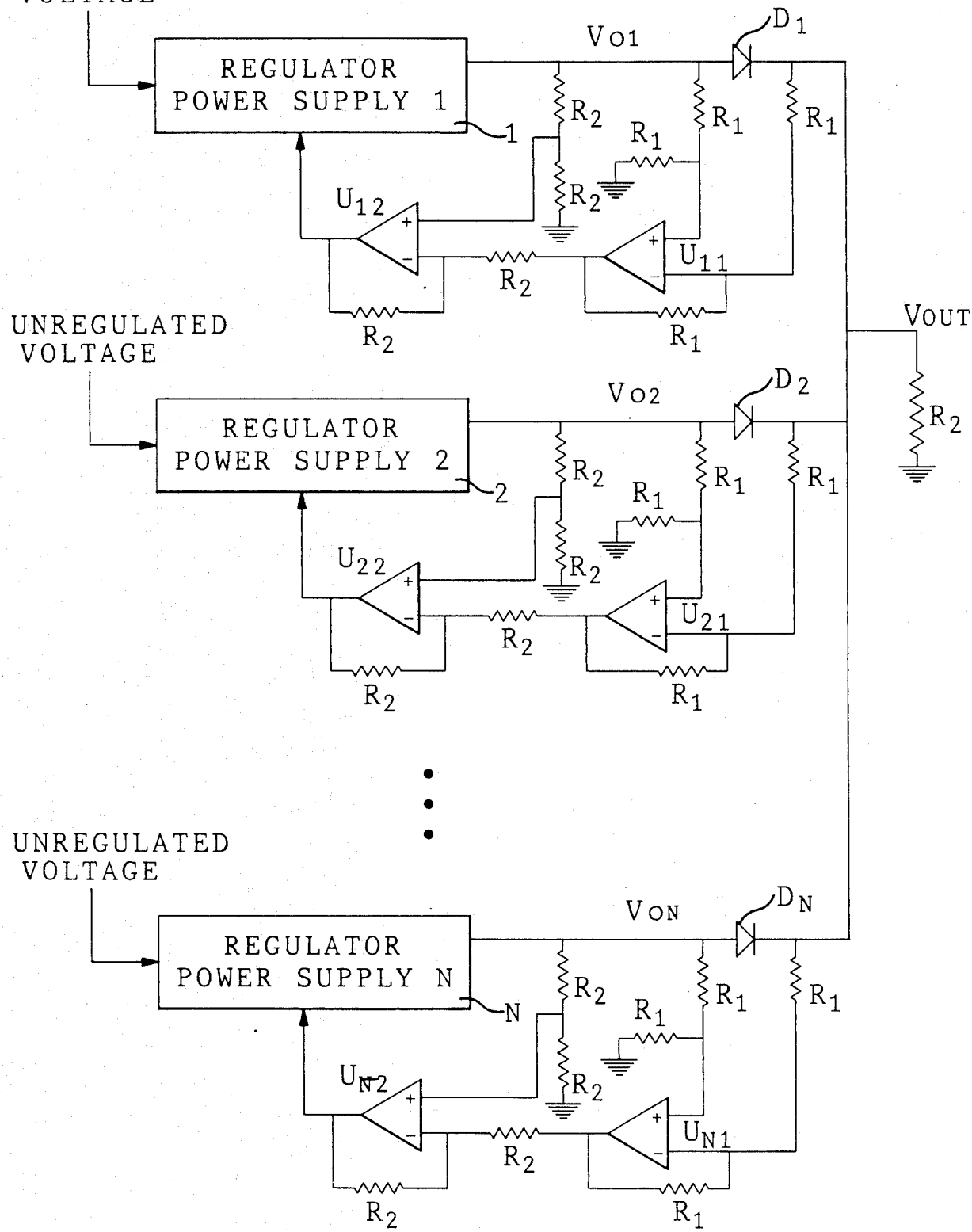
FIG. 2 is a circuit diagram of a redundant power supply system with improved control signal in accordance with the present invention.

Referring now to FIG. 2, there is shown a circuit diagram of a control signal technique whereby all of the operational power supplies of the redundant system are continually in a powered up state for immediate supply of power in the event called upon. The circuit includes the same power supplies 1, 2, ... N and the same diodes D1, D2, ... DN as in the circuit of FIG. 1 feeding the same load RL with output voltage Vout.

The prior art redundant power supply system is improved by replacing the feedback lines of each power supply thereof with a first differential amplifier U11, U21, ... UN1, the inputs thereto being fed from opposite sides of the respective output diodes D1, D2, ... DN, through identical resistances $R_{11}$, $R_{12}$, $R_{13}$, $R_{21}$, $R_{22}$, $R_{23}$, ... $R_{N1}$, $R_{N2}$, $R_{N3}$. The first amplifiers include a feedback resistor $R_{17}$, $R_{27}$, ... $R_{N7}$. Accordingly, the output of each first amplifier is the difference voltage or proportional to the difference voltage across the associated output diode or between Vout and the output of each power supply. This difference voltage is then differenced in a second differential amplifier U21, U22, ... UN2 with the output voltage of its respective power supply, the input signals thereto being applied through identical resistors $R_{14}$, $R_{15}$, $R_{16}$, $R_{24}$, $R_{25}$, $R_{26}$, ... $R_{N4}$, $R_{N5}$, $R_{N6}$. The second amplifiers include a feedback resistor $R_{18}$, $R_{28}$, ... $R_{N8}$. The output of the second differential amplifier provides the regulating feedback voltage to each of the power supplies. It is preferred that the amplifiers U11, U21, ... UN1 and the amplifiers U12, U22, ... UN2 all be unity gain amplifiers, although this requirement is not critical to the proper operation of the circuit since other relationships between the amplifiers associated with each power supply can be provided which will provide proper operation.

It can be seen that each of the power supplies in the standby mode will remain in the active mode in the circuit of FIG. 2 since, when conduction ceases from a particular power supply, the voltage drop across the series diode will drop to zero volts. Accordingly, when zero volts at the output of the first amplifier is differenced from the diode input voltage (power supply output voltage), the diode input voltage is then regulated to a value equal to the output voltage across the shared load (Vout). This operation avoids power supply shutdown in the power supplies operating in the standby mode and permits voltage sensitive self tests to indicate power supply status accurately.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A redundant power supply system comprising:
   (a) a plurality of power supplies, each power supply having a supply output terminal and a supply feedback terminal;
   (b) a system output terminal for coupling the output of said power supply system to a load;
   (c) a plurality of diodes, one of said diodes being coupled between each said supply output terminal and said system output terminal;
   (d) a feedback circuit for each power supply, each said feedback circuit comprising:
   (e) first means to provide a signal indicative of the voltage drop across the diode associated with said power supply; and
   (f) second means to couple a signal to said feedback terminal indicative of the difference between the voltage at said supply output and said signal indicative of the voltage drop across said diode.

2. The system of claim 1 wherein said first means is a first differential amplifier having a pair of inputs, said inputs being coupled across said diode.

3. The system of claim 2 wherein said input to said first means includes a first resistor having predetermined resistance coupled between the cathode of said diode and one of said inputs of said first amplifier and second and third series resistors, each having said predetermined resistance and coupled between the anode of said diode and reference voltage, the junction of said second and third resistors being coupled to another input of said first amplifier.

4. The system of claim 2 wherein said second means is a second differential amplifier having one input coupled to the supply output terminal of the associated power supply and a second input coupled to the output of said first means.

5. The system of claim 4 wherein said input to said first means includes a first resistor having predetermined resistance coupled between the cathode of said diode and one of said inputs of said first amplifier and second and third series resistors, each having said predetermined resistance and coupled between the anode of said diode and reference voltage, the junction of said second and third resistors being coupled to another input of said first amplifier.

6. The system of claim 5 wherein said input to said second means includes a fourth resistor having a second predetermined resistance coupled between the output of said first means and of said inputs of said second amplifier and fifth and sixth series resistors, each having said second predetermined resistance and coupled between the anode of said diode and reference voltage, the junction of said fifth and sixth resistors being coupled to another input of said second amplifier.

7. The system of claim 4 wherein said input to said second means includes a fourth resistor having a second predetermined resistance coupled between the output of said first means and of said inputs of said second amplifier and fifth and sixth series resistors, each having said second predetermined resistance and coupled between the anode of said diode and reference voltage, the junction of said fifth and sixth resistors being coupled to another input of said second amplifier.

8. The system of claim 1 wherein said second means is a second differential amplifier having one input coupled to the supply output terminal of the associated power supply and a second input coupled to the output of said first means.

9. The system of claim 8 wherein said input to said second means includes a fourth resistor having a second predetermined resistance coupled between the output of said first means and of said inputs of said second amplifier and fifth and sixth series resistors, each having said second predetermined resistance and coupled between the anode of said diode and reference voltage, the junction of said fifth and sixth resistors being coupled to another input of said second amplifier.

* * * * *